(No Model.)  11 Sheets—Sheet 1.
G. H. HILGARTNER.
PAPER BOX MAKING MACHINERY.
No. 580,086. Patented Apr. 6, 1897.
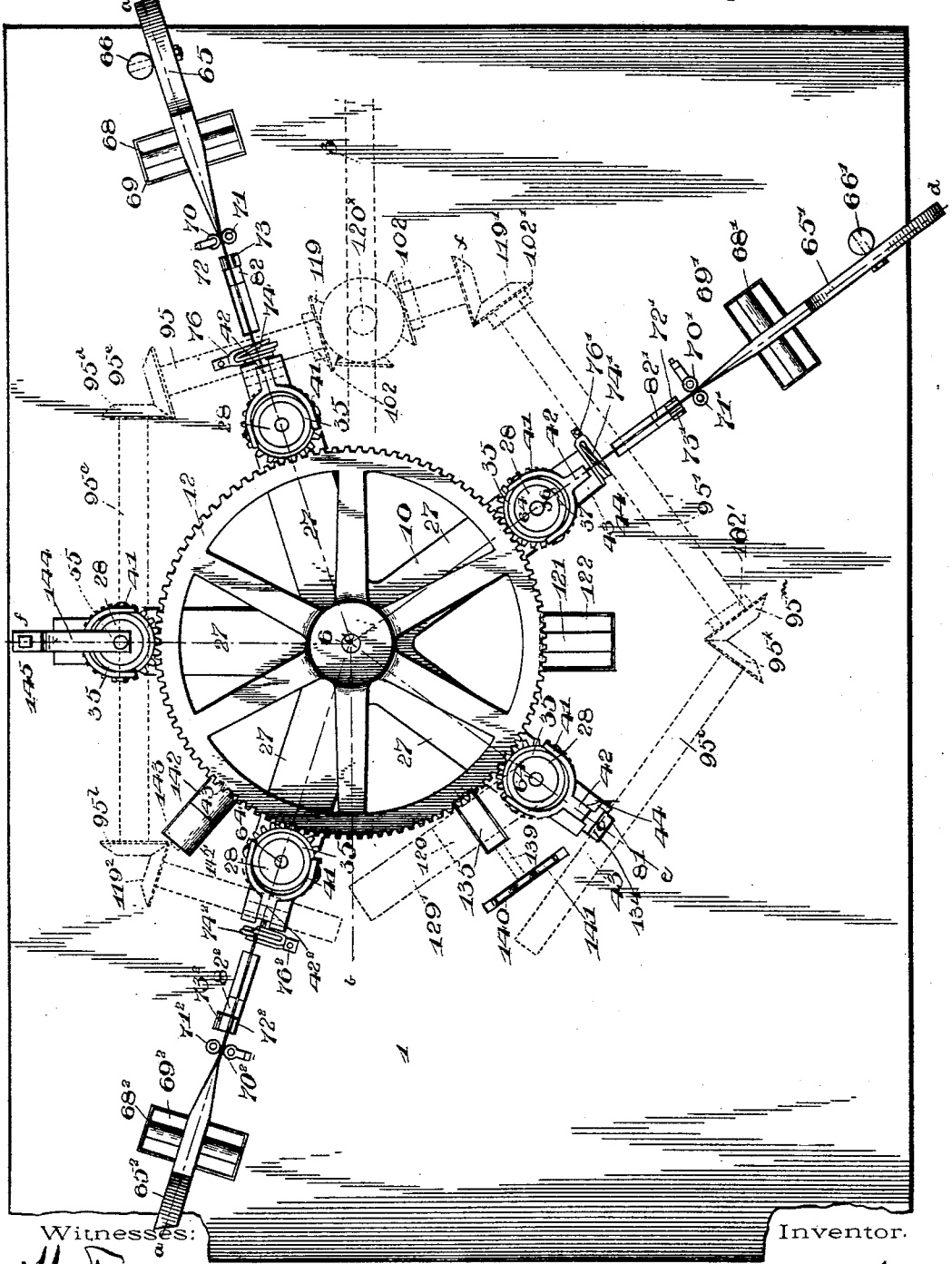
Witnesses:  Inventor.
 Geo. H. Hilgartner,
By H. B. Willson,
Attorney.

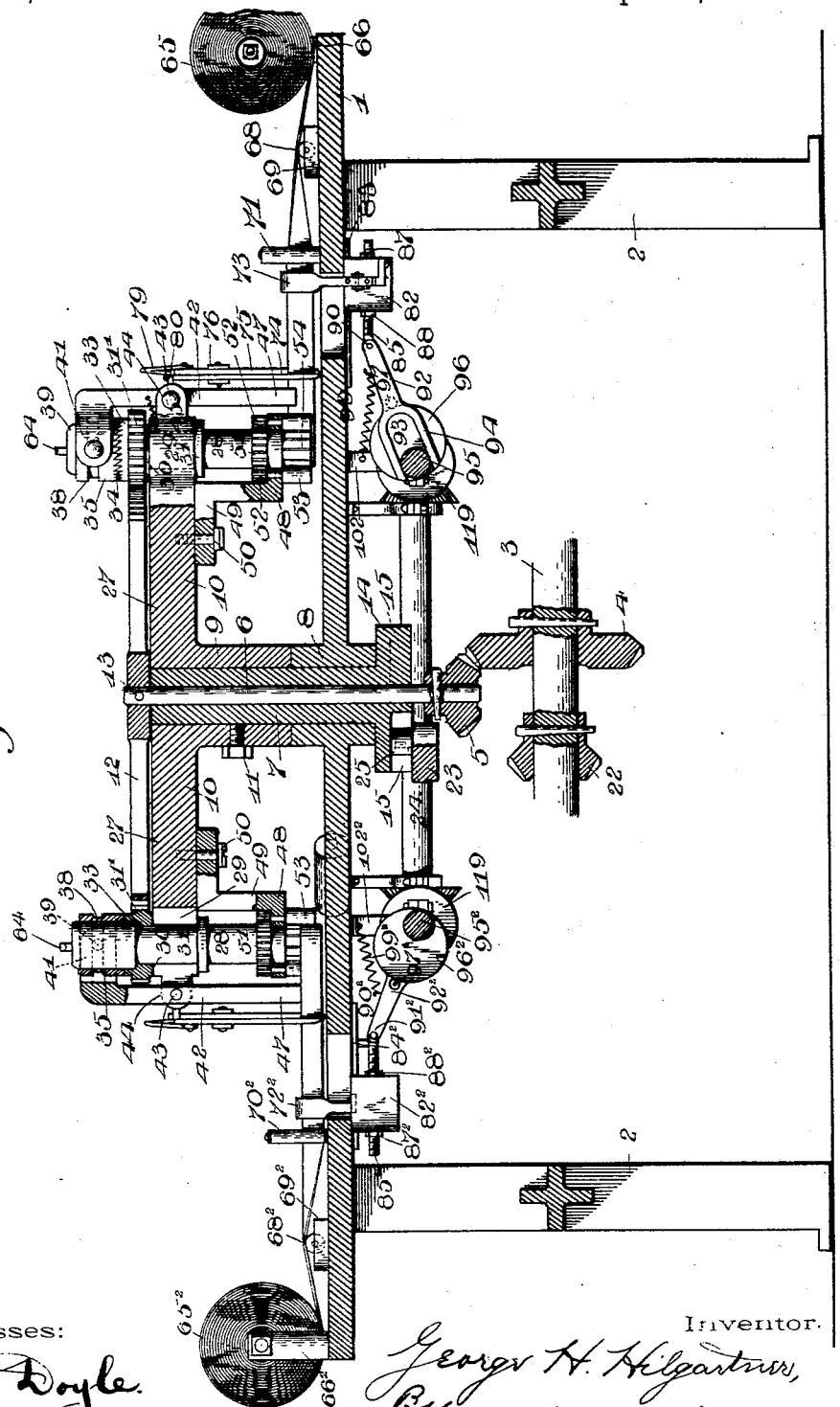

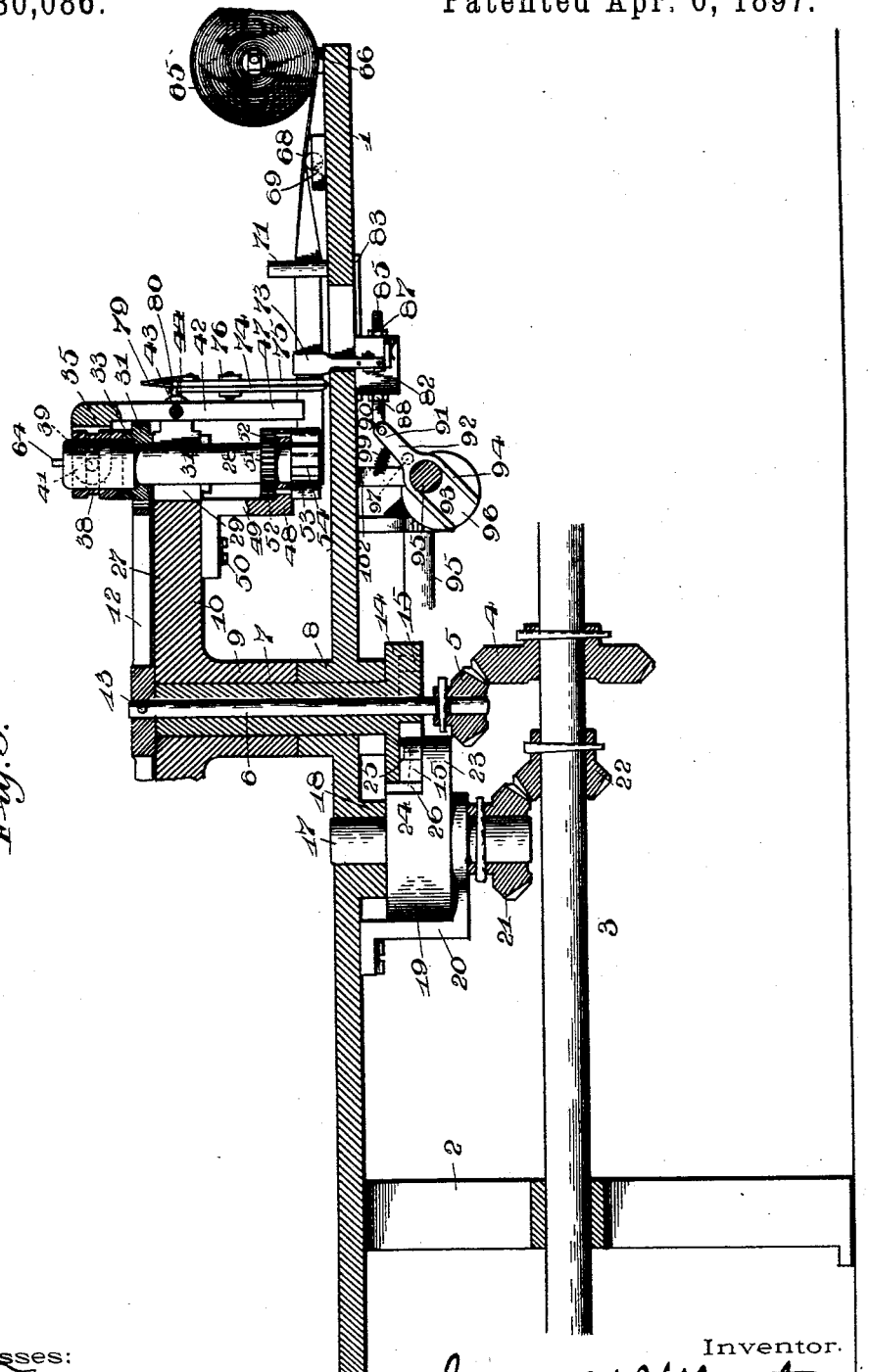

(No Model.) 11 Sheets—Sheet 4.
G. H. HILGARTNER.
PAPER BOX MAKING MACHINERY.
No. 580,086. Patented Apr. 6, 1897.
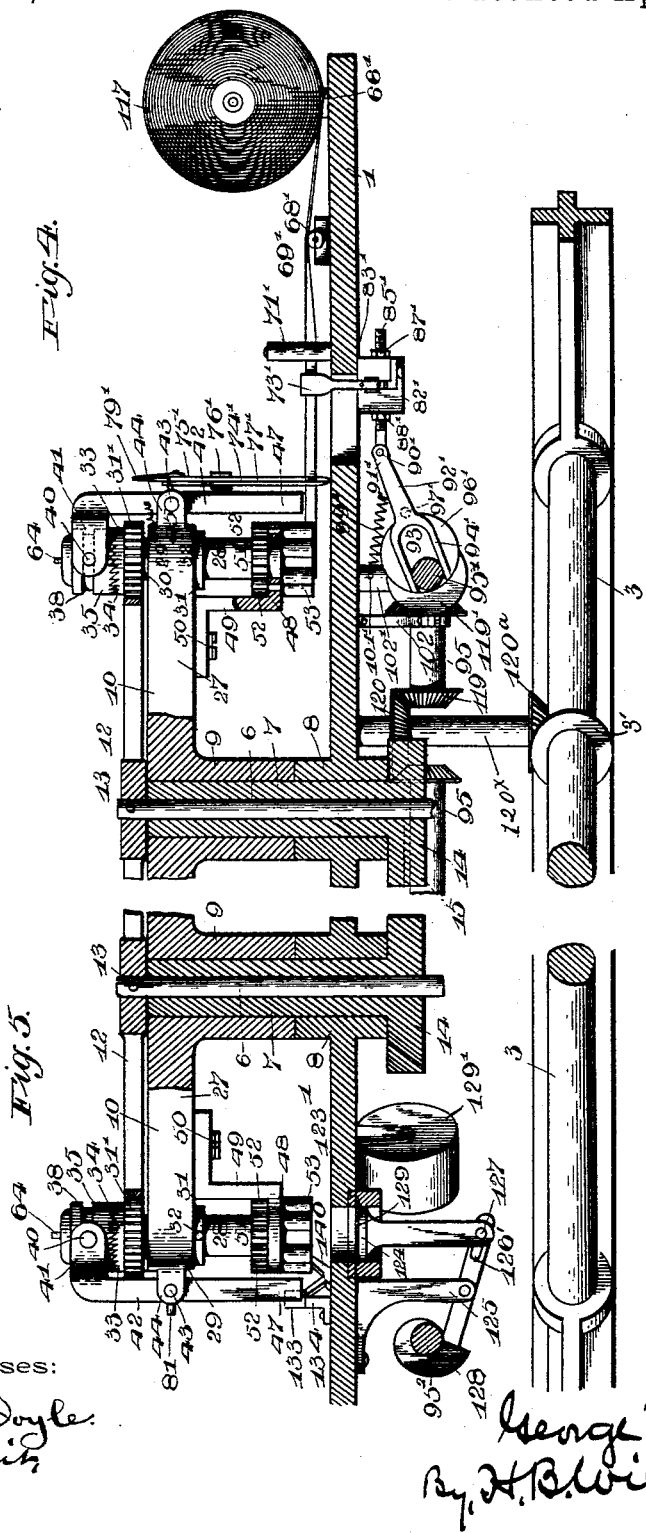
Witnesses:
Wm. J. Doyle.
A. B. Suit.
Inventor.
George H. Hilgartner
By H. B. Willson,
Attorney.

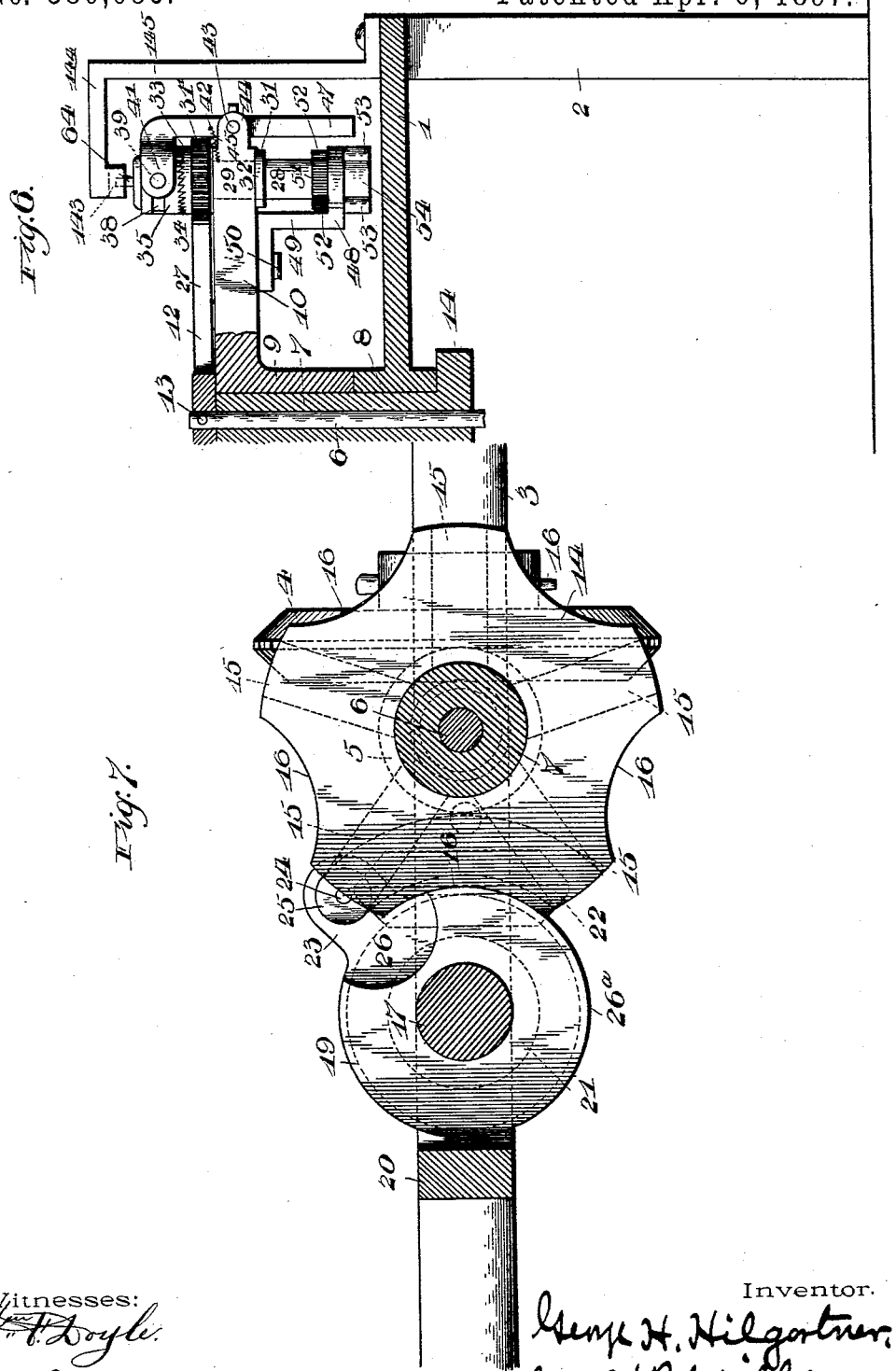

(No Model.) 11 Sheets—Sheet 6.
G. H. HILGARTNER.
PAPER BOX MAKING MACHINERY.
No. 580,086. Patented Apr. 6, 1897.
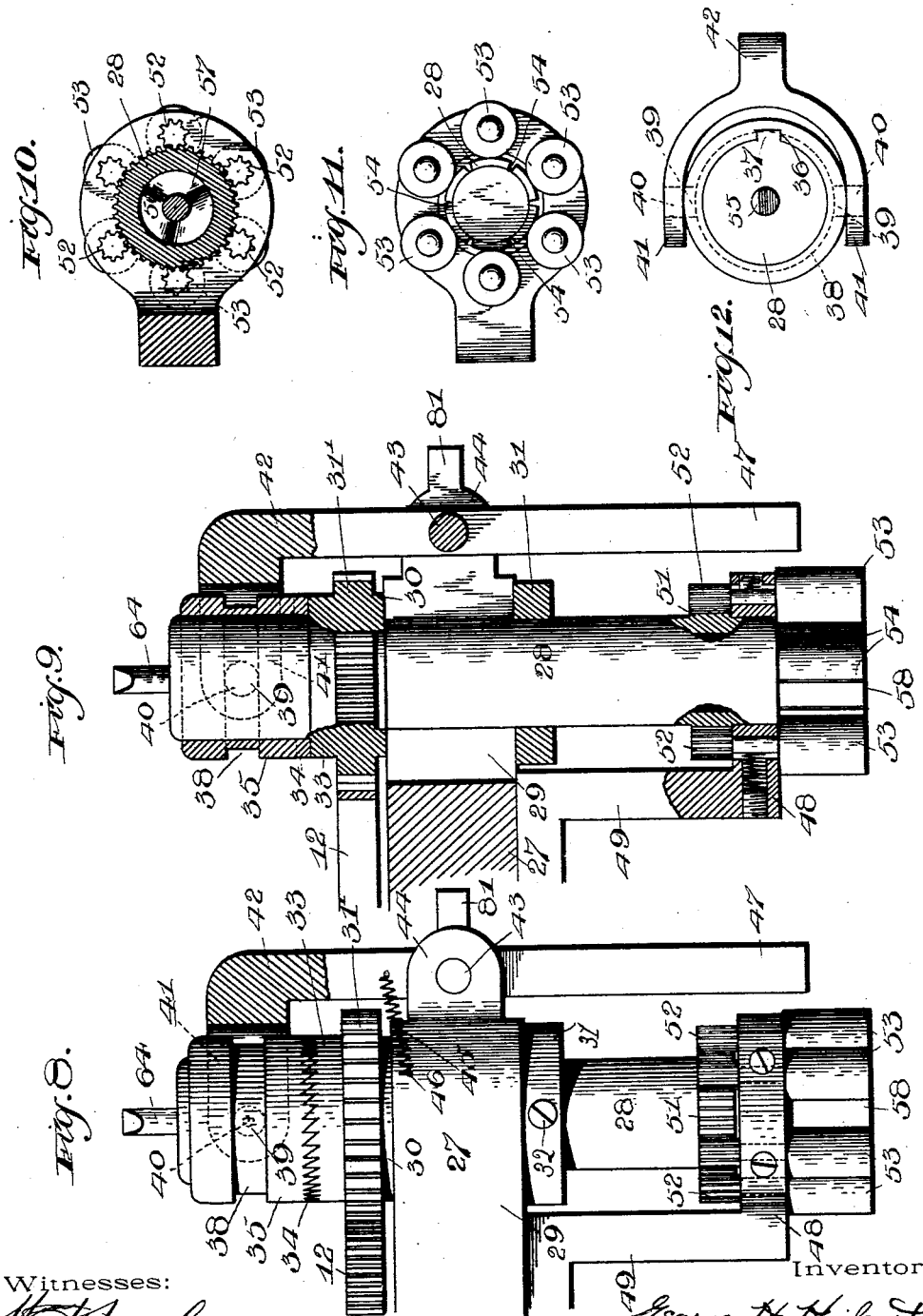
Witnesses:
W. T. Doyle.
A. B. Smith.
Inventor.
George H. Hilgartner,
By H. B. Willson,
Attorney.

(No Model.) 11 Sheets—Sheet 7.
G. H. HILGARTNER.
PAPER BOX MAKING MACHINERY.
No. 580,086. Patented Apr. 6, 1897.
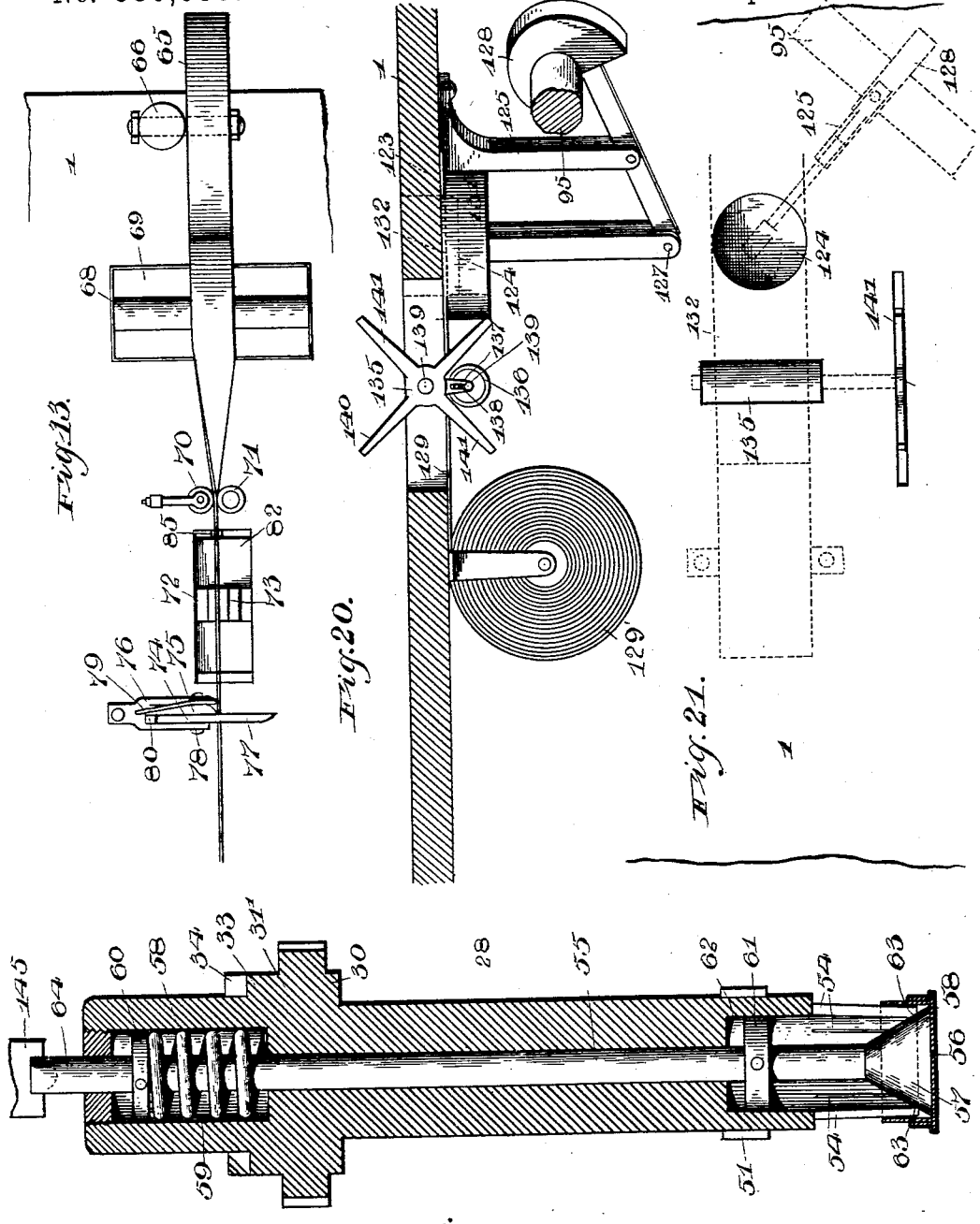

(No Model.) 11 Sheets—Sheet 8.
G. H. HILGARTNER.
PAPER BOX MAKING MACHINERY.
No. 580,086. Patented Apr. 6, 1897.
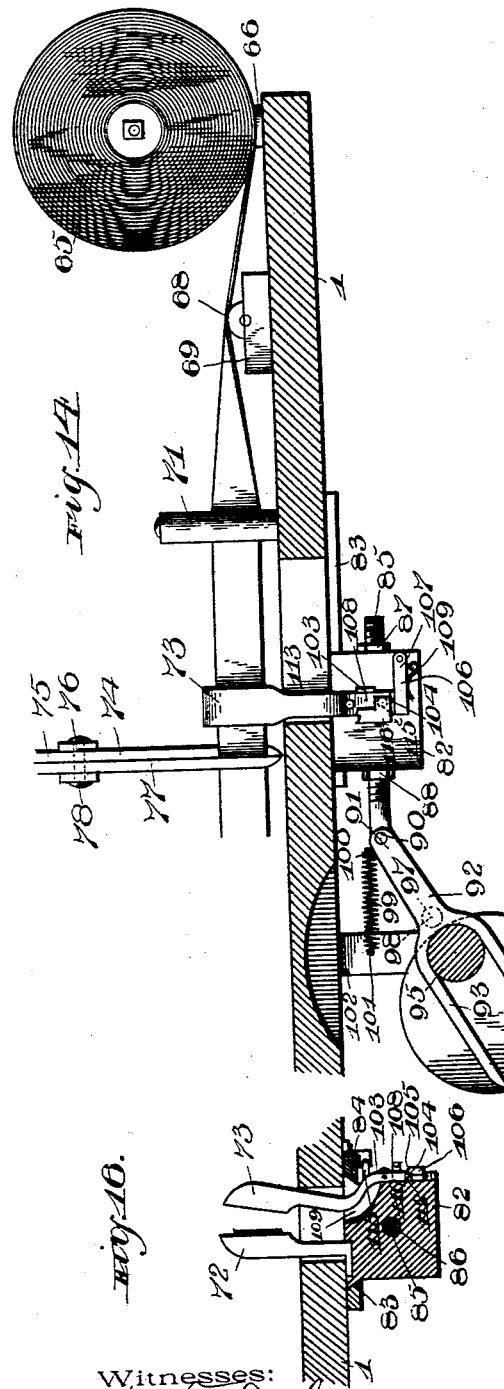
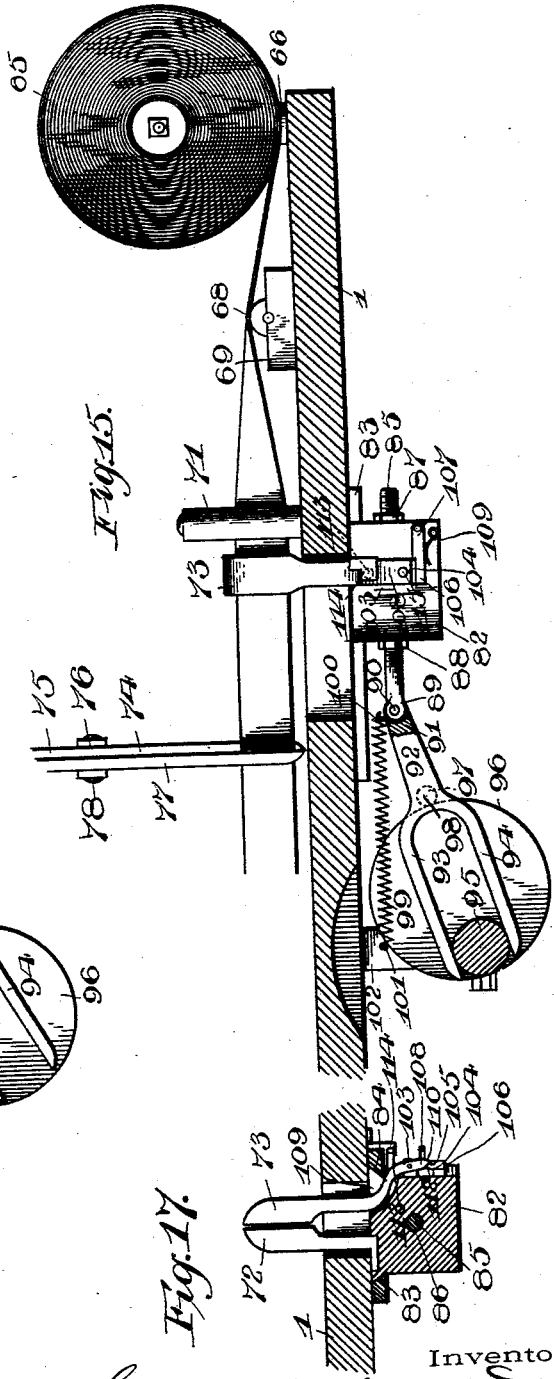
Witnesses:
Wm. F. Hoyle.
A. B. Smit.
Inventor.
George H. Hilgartner,
By H. B. Willson.
Attorney.

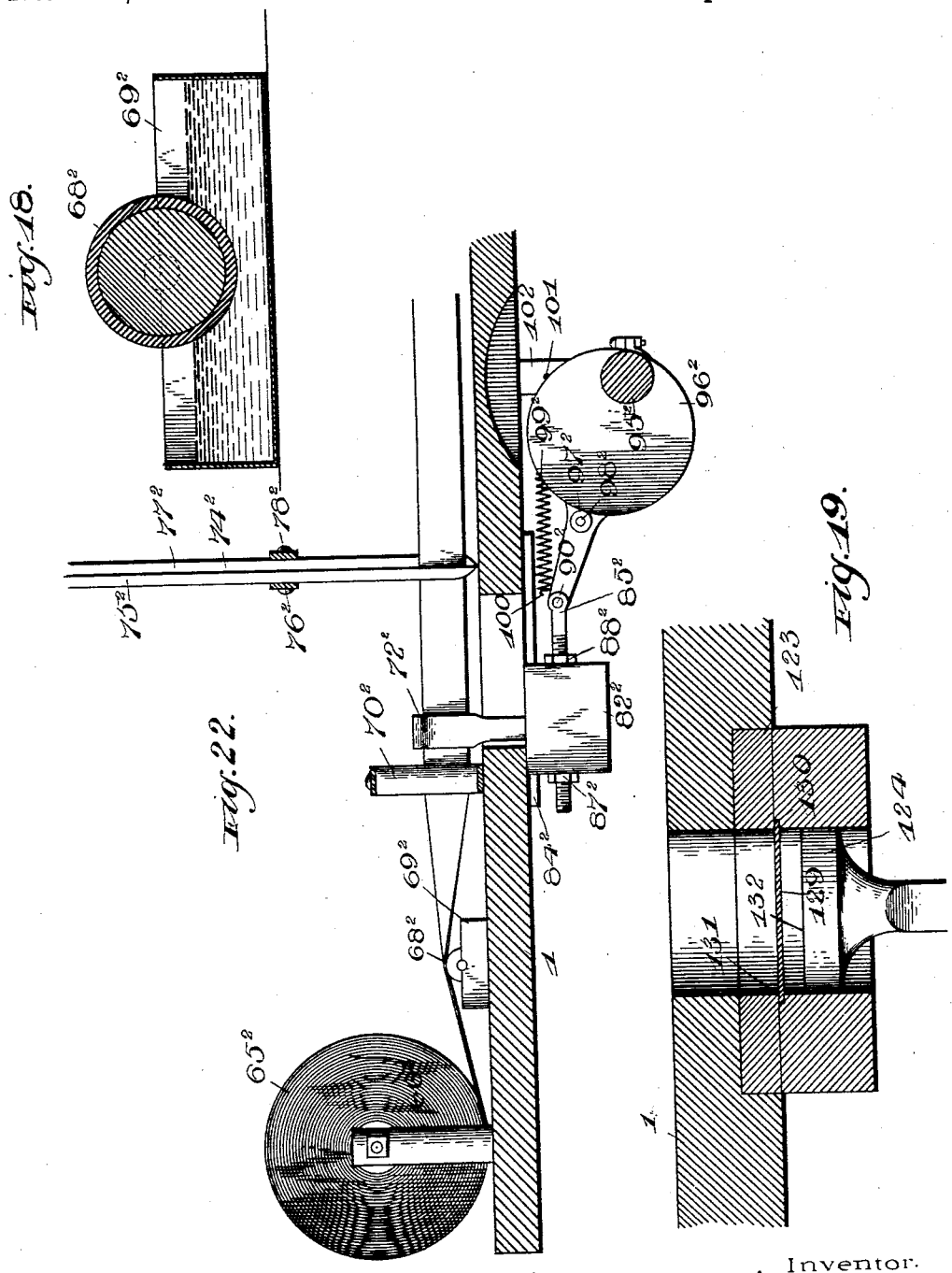

(No Model.) 11 Sheets—Sheet 10.
G. H. HILGARTNER.
PAPER BOX MAKING MACHINERY.
No. 580,086. Patented Apr. 6, 1897.
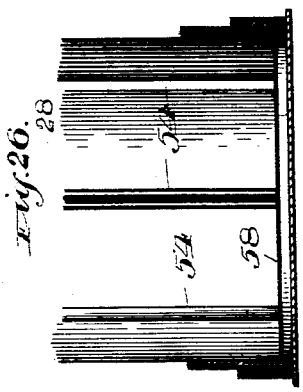
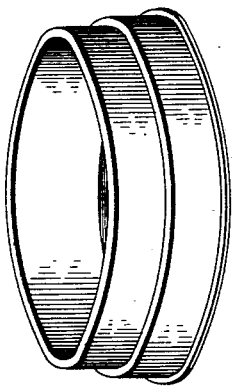
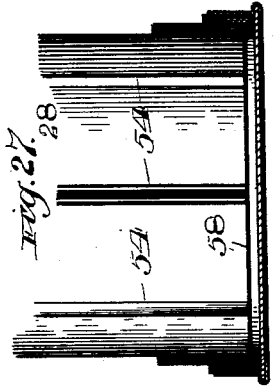
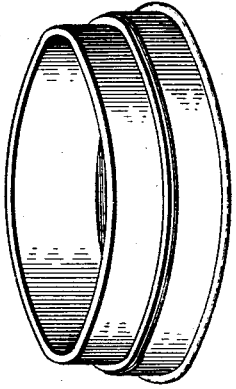
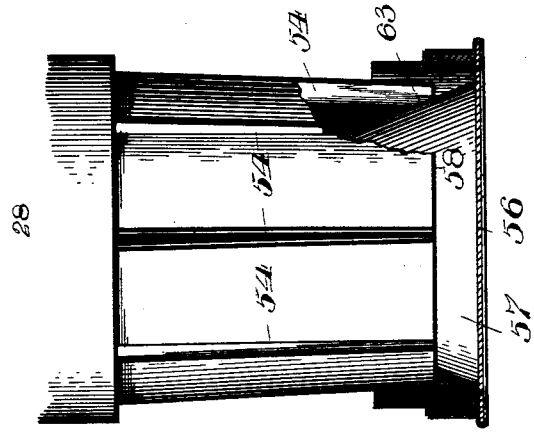
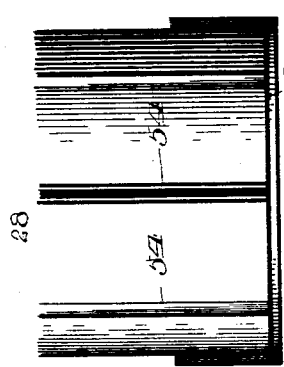
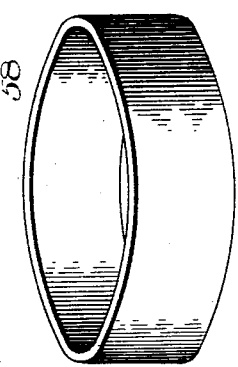
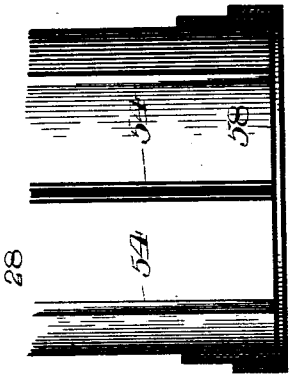
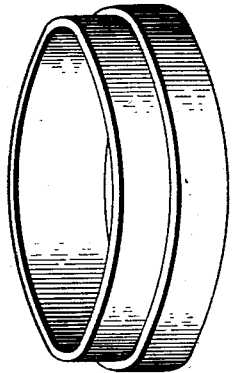
Witnesses:　　　　　　　　　　　Inventor.

(No Model.)  11 Sheets—Sheet 11.
G. H. HILGARTNER.
PAPER BOX MAKING MACHINERY.
No. 580,086. Patented Apr. 6, 1897.
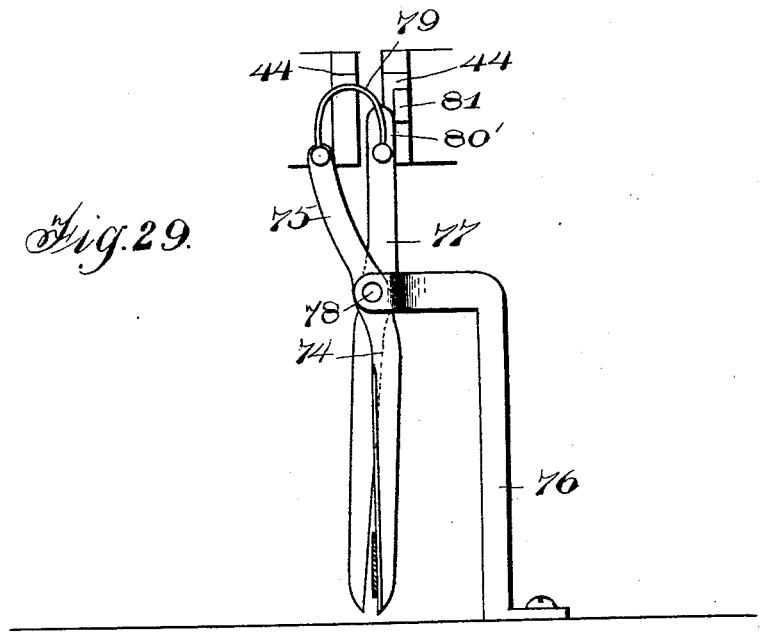
Fig. 29.
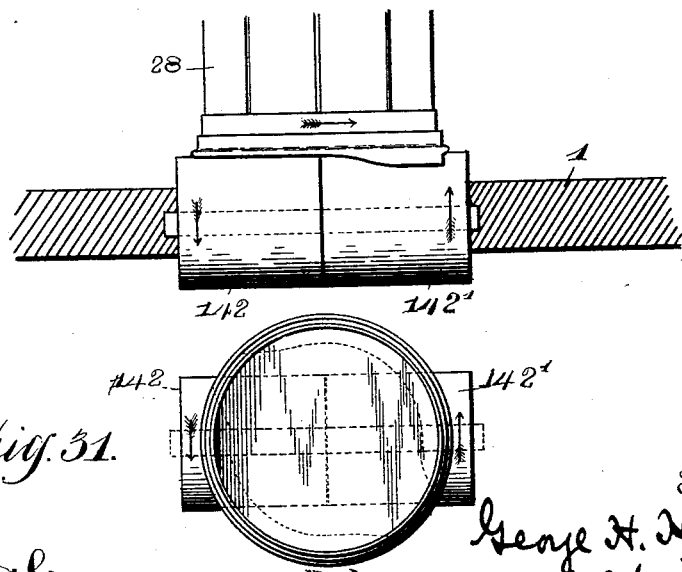
Fig. 30.
Fig. 31.
Witnesses
Wm. F. Doyle
J. A. Hilton
Inventor
George H. Hilgartner
By H. B. Willson
Attorney

UNITED STATES PATENT OFFICE.

GEORGE H. HILGARTNER, OF RICHMOND, VIRGINIA.

PAPER-BOX-MAKING MACHINERY.

SPECIFICATION forming part of Letters Patent No. 580,086, dated April 6, 1897.

Application filed June 30, 1896. Serial No. 597,595. (No model.)

*To all whom it may concern:*

Be it known that I, GEORGE H. HILGARTNER, a citizen of the United States, residing at Richmond, in the county of Henrico and State of Virginia, have invented certain new and useful Improvements in Paper-Box-Making Machinery; and I do declare the following to be a full, clear, and exact description of the invention, such as will enable others skilled in the art to which it appertains to make and use the same.

My invention has relation to paper-box-making machinery, and more particularly to that class employed in manufacturing round or circular boxes for pills and the like; and the object is to produce a machine that will, so far as possible, produce this style of box automatically; and to this end the novelty consists in the construction, combination, and arrangement of the same, as will be hereinafter more fully described, and particularly pointed out in the claims.

In the accompanying drawings the same figures of reference indicate the same parts of the invention.

Figure 1 is a top plan view of my improved box-making machine. Fig. 2 is a longitudinal section on the broken line $a\,c\,a'$ of Fig. 1. Fig. 3 is a similar view on the broken line $b\,c\,a'$ of Fig. 1. Fig. 4 is a similar view on the broken line $c\,d$ of Fig. 1. Fig. 5 is a similar view on the broken line $c\,e$ of Fig. 1. Fig. 6 is a similar view on the broken line $c\,f$ of Fig. 1. Fig. 7 is a detail plan of the mechanism for imparting an intermittent motion to the former-head. Fig. 8 is an enlarged elevation of the former-head. Fig. 9 is an enlarged vertical section of the same. Fig. 10 is a cross-section of the lower end of the former-head. Fig. 11 is a bottom plan view. Fig. 12 is a top plan view of the same. Fig. 13 is an enlarged top plan view of the paper-feed mechanism. Fig. 14 is a similar side elevation of the same, showing the position of the grip-fingers when open. Fig. 15 is a similar view showing the position of the parts when the grip-fingers are closed. Fig. 16 is a vertical section of the grip-fingers opened. Fig. 17 is a vertical section with the grip-fingers closed. Fig. 18 is a section of the paste-roller and its reservoir. Fig. 19 is a section of the dies for forming the bottom or top blank for the box. Fig. 20 is a front elevation of the feed mechanism for the cardboard roll from which the top and bottom blanks are punched. Fig. 21 is a top plan view of the same. Fig. 22 is a detail of the mechanism employed in applying the binder or finishing-strip. Fig. 23 is a vertical section of the former-cylinder in the act of discharging the finished box. Fig. 24 shows the lower portion of the former-cylinder during the first step of the operation with the inner body of the box wound on it, and below it is a view of the partially-formed box at this stage. Fig. 25 is a similar view showing the second stage of the formation of the box with a view of the partially-formed box below it. Fig. 26 is a similar view of the same with the blank applied to form the bottom and a view of the box at this stage below it. Fig. 27 shows the former-cylinder with the partially-formed box on it in the act of receiving the binder or finishing-strip. Fig. 28 is a similar view showing the position of the parts when the former-cylinder is in the act of discharging or releasing the finished box. Fig. 29 is a front view of the shears and the arm 27, taken on a line passing vertically at the right of the shearing mechanism in Fig. 2. Fig. 30 is a detail view of the mandrel and rollers, showing the rollers in the act of folding over the lower edge of the finished strip. Fig. 31 is a detail view showing the bottom of the box in the act of passing over the rubber rollers 142 142'.

1 represents a suitable table-bed, supported on legs 2 2, in which is journaled a driving-shaft 3, carrying a bevel gear-wheel 4, the teeth of which mesh with a similar gear-wheel 5, secured to the lower end of a vertical shaft 6, which is journaled in a vertical sleeve 7, having its bearing in the integral collar 8 on the table-bed 1. The upper end of the collar 8 forms a bearing for the lower end of the hub 9 on the former-head 10, which is secured to the vertical sleeve 7 by a set-screw 11.

The upper end of the vertical shaft 6 projects above the sleeve 7, and on its projecting end is secured a gear-wheel 12 by a pin 13. The hub of this gear-wheel 12 rests upon the upper end of the sleeve 7, and thus supports the vertical shaft 6 and its gear-wheel 5 in position, so that said shaft revolves in the sleeve and the sleeve revolves in the collar or bearing in the table-bed, and both shaft and sleeve revolve independently of each other.

The lower end of the sleeve 7, below the table-bed, is formed with an integral disk 14, the lower face of which is formed with a series of radial recesses 15 15, which are open at their outer ends, and the periphery of said disk between the ends of the radial recesses is in the form of a concave recess 16.

A vertical shaft 17 has its upper end journaled in a collar 18, integral with the table-bed, and upon said shaft is secured a disk 19, the lower face of which rests upon a bracket 20, secured to the bed of the table. The lower end of the shaft 17 projects through said bracket, and on its extreme end is mounted a bevel gear-wheel 21, which meshes with a similar gear-wheel 22, secured to the main shaft 3.

The disk 19 is formed with an integral radially-projecting lug 23, on the upper face of which is secured a screw-stud 24, on which is journaled a friction-roller 25, and as the disk 19 is rotated the roller 25 is projected into the open end of one of the radial recesses 15 in the disk 14, and as the disk 19 rotates the slotted end of the disk 14 enters the recess 26 of the disk 19, thus permitting the roller 25, working in the radial recess 15, to move the disk 14 around about one-fifth of a revolution. After the roller 25 has left the recess 15 the periphery 26ª of the disk 19 engages one of the concave recesses 16 in the disk 14 and holds it stationary until the disk 19 has made a complete revolution, the roller on its lug 23 again entering a radial recess 15 on the disk 14 and rotating it one fifth of a revolution, as before.

From the above description it will be seen that the main shaft 3 is continuously rotated in one direction when the machine is in operation, and by means of the gears 4 and 5 a continuous rotary motion is imparted to the vertical shaft 6 and the horizontal gear-wheel 12, while at the same time an intermittent rotary motion is given the former-head 10, the vertical sleeve 7, and its disk 14 by the disk 19, its shaft and gear-wheel 21, and the gear-wheel 22 on the main shaft.

I will now proceed to describe the former-head 10, which is formed with five equidistant radial arms 27, in the outer ends of each of which is journaled a vertical forming-cylinder 28, and as each former-cylinder is an exact duplicate of the other a description of the construction and operation of one will answer for all.

The outer end of each arm 27 is formed with an integral split limb 29, in which the cylinder 28 is vertically journaled between the shoulder 30 of the gear-wheel 31', loosely journaled on said cylinder, and the collar 31, secured to the cylinder by a set-screw 32. The gear-wheel 31', which rotates freely on the cylinder, meshes with the teeth of the gear-wheel 12 on the vertical shaft 6, and the upper face of the integral collar 33 of the gear-wheel 31, is formed with a series of clutch-teeth 34, which engage similar teeth on the clutch-sleeve 35, which is mounted on the upper end of the cylinder 28 and has a vertical reciprocating movement thereon by means of a keyway 36, sliding on a key 37 on the end of said cylinder.

38 is a circumferential recess on the clutch-sleeve 35, into which project two friction-rollers 39 39, mounted on studs 40 40 on the inner ends of the bifurcated arm 41 of the lever 42, which is fulcrumed on the bolt 43, which passes through the ears 44 44 on the split hub 29. A spiral spring 45 has one end secured to the lever 42, above its fulcrum-point, and the other end secured to a pin 46 on the split hub 29, and the office of said spring is to keep the clutch 35 in engagement, so that the former-cylinder will continuously revolve at all times, except when the lower arm 47 of the lever 42 is operated (as will be hereinafter explained) to release said clutch and allow the former-cylinder to remain stationary a brief interval while the gear-wheel 31' is still revolving by the gear-wheel 12.

The lower end of the former-cylinder 28 is journaled in the arm 48 of a bracket 49, secured to the outer end of the arm 27 by a bolt 50. Immediately above the arm 48 of the bracket 49 is a gear-wheel 51, secured to and revolving with said former-cylinder. This gear-wheel meshes with and rotates an annular series of pinions 52, one of which is secured upon the upper end of each of the vertical rollers 53, journaled in the arm of the bracket 49. These rollers are arranged concentrically around the lower end of the former-cylinder and serve to press the strip of paper around the end of the cylinder in the process of forming the box.

The lower end of the former-cylinder 28 is provided with a series of longitudinal slots 54, which permit of its being expanded and contracted to a certain degree, as will be hereinafter explained.

55 is a shaft vertically mounted in said former-cylinder, the face 56 of its conical end 57 being flush with the lower edge 58 of the cylinder, when said shaft is forced upwardly in the cylinder by the spiral spring 58, one end of which rests in the lower end of the recess 59 in the upper end of the cylinder, the upper end of said spring bearing against a collar 60, secured to the shaft 55. A collar 61, secured to the shaft 55, rests against the shoulder 62 in the cylinder and serves to limit the upward play of the shaft. It will thus be seen that when the lower face 56 of the conical end 57 is flush with the lower end 58 of the cylinder the conical face of the end 57 is in contact with the correspondingly-beveled inner edge 63 of the lower end of the former-cylinder, and when in this position the conical end forces the split end of the former-cylinder outwardly, so that its periphery forms a true cylinder, and if the upper end 64 of the shaft 55 be forced downward a short distance the face 56 of its conical end 57 will be projected below the edge 58 of the lower end of the cylinder 28, and the inner beveled edge 63 will ride up on the cone and at the same time spring inwardly, thus contracting the lower end of said former-cylinder and reducing the diameter of its periphery. When the pressure on the upper end 64 of the shaft 55 is removed, the spring 58 will restore said shaft to its normal position with the face of the conical end of the shaft flush with the lower end of the former-cylinder.

65 is a paper-reel mounted on a standard 66, which carries a roll of paper of a width corresponding approximately to the height of the box to be made. The end of this paper is passed over the upper surface of a paste-roller 68, journaled in a paste-reservoir 69, the lower surface of the paste-roller projecting below the level of the liquid paste in the reservoir, and as the strip of paper is drawn across the upper face of the paste-roller it rotates it, thus keeping its surface continually supplied with paste, from which it is transferred to the under side of the strip of paper as it is drawn across it. The strip of paper with the paste on one side is then twisted one-quarter of a circle and passed between the vertical guide-rollers 70 71, and from them it is led to the grip-fingers 72 73 and by them moved forward between the vertical blades of the shears 74 until its end is passed between one of the vertical rollers 53 and the lower end of the former-cylinder 28, which is being rotated by the gear-wheel to wind the strip of paper around it a sufficient number of times to form the body of the box, the former-cylinder in the meanwhile being held stationary as regards its planetary revolution by the disks 14 and 19, as before described, while it is being rotated on its own axis to wind the paper around it by the gear-wheels 31' and 12.

The shears 74 comprise a rigid vertical blade 75, secured to a bracket 76 on the table-bed, and a pivoted blade 77, secured on the stud 78, is normally held open by a C-spring 79.

80 is a projecting lug on the pivoted blade 77, and as the end of the arm 27 moves around a projecting dog 81 on said arm comes in contact with the lug 80 on the movable blade 77 and closes it, severing the strip of paper, the severed end being drawn in and wrapped around the end of the former-cylinder while it is traveling around to the next station, where it receives the outer body of the box, as will be hereinafter described.

The vertical grip-fingers 72 and 73 are mounted on a sliding block 82, having a reciprocating motion in V-shaped guides 83 84, located on the under side of the table-bed 1.

85 is a screw-threaded rod passing through a longitudinal orifice 86 in the block 82, and said rod is provided with nuts 87 88, located on the front and rear of the block for adjustably securing it to the rod. The end of this rod 85 is provided with an eye 89, through which a bolt 90 passes to secure it to the bifurcated end 91 of a cam-rod 92, the opposite end of which is provided with arms 93 94, which straddle the counter-shaft 95. This counter-shaft is provided with a cam 96, the periphery of which is in contact with a friction-roller 97, mounted on a stud 98 on one side of the cam-rod 92.

99 is a spiral spring, one end of which is secured to a hook 100 on the cam-rod and the other end to a stud 101 on one of the brackets 102, in which the shaft 95 is journaled. The cam, pressing against the friction-roller 97, forces the cam-rod and block 82 away from the shaft 95, and the spring returns them, thus giving the proper irregular reciprocating movement to the block and grip-fingers.

The counter-shaft 95 is mounted in a bracket 102, secured to the under side of the table, and one end of said shaft is provided with a bevel gear-wheel 119, meshing with a similar gear 120 on a vertical shaft $120^\times$, on the lower end of which is a gear $120^a$, which in turn meshes with a gear 3' on the main shaft 3.

The grip-finger 72 is rigidly secured to the face of the block 82, and its upper end extends upwardly and vertically parallel on one side of the strip of paper. The other finger 73 lies on the opposite side of the paper and parallel with the former finger, and it is pivoted on the face of the block 82 to a knee 103, so its upper end will move to and from the rigid grip-finger to alternately grip and release the strip of paper, as occasion requires.

The lower end 108 of the pivoted grip-finger 73 is V-shaped longitudinally, and it is adapted to engage one side 104 or the other side 105 of a V-shaped lug 106 on the outer end of an arm 107, pivoted to the bottom of the sliding block 82. The lower end 108 of the pivoted grip-finger 73 extends downwardly, and the lug 106 on the arm 107 extends upwardly to engage it.

A spring 109, secured to the bottom of the block 82, serves to press the V-shaped lug 106 against the V-shaped end of the pivoted grip-finger. When the inclined face 104 of the V-shaped lug 106 is in engagement with the inclined face 110 of the lower end 108 of the grip-finger 73, the upper end or jaw of said grip-finger is out of contact with the jaw on the rigid grip-finger, and in this position they will slide freely along on each side of the paper without gripping it; but if the inclined face 105 of the lug 106 is in engagement with the inclined face 112 of the lower end of the grip-finger 82 it then presses the upper end or jaw of said finger 73 inwardly, gripping the strip of paper between it and the upper end of rigid grip-finger, so that as the fingers are moved along by the sliding block 82 the paper will be held and carried along between them.

113 is a projecting pin on the side of the pivoted grip-finger above its fulcrum-point, and at the outer end of its stroke the end of this pin 113 comes in contact with the inclined face of a stationary lug 114, which presses the upper end of said finger inwardly to grip the paper, it being held in this position by the inclined face 105 of the lug 106 on the arm 107 pressing upwardly against the inclined face of the V-shaped lower end of the grip-finger 73, and in this position the cam moves the sliding block 82 inwardly toward the former-cylinder and inserts the free end of the strip of paper between the lower end of the former-cylinder and its rollers 53, which is drawn in between them and rolled around the end of the cylinder to form the body of the box. At the same time the sliding block has arrived at that end of its stroke, and a pin 115 on the lower end of the pivoted grip-finger 73, below its fulcrum-point, comes in contact with the inclined face of a lug 116, which presses the lower end of said grip-finger inwardly, throwing its upper end or jaw out of engagement with the rigid grip-finger and releasing the grip on the paper. As this is done the lower V-shaped end of the pivoted grip-finger presses down the arm 107 and engages with the opposite inclined face of its lug 106, which holds the pivoted grip-finger open, and in which position the block 82 is moved backward by its cam to the end of its stroke, where the pin 113 again comes in contact with the stationary lug 114 to close it on the paper, and the operation of carrying the strip of paper forward is again repeated.

The operation of the machine is so timed that as soon as the former-cylinder comes to a stop in line with the paper-reel the cam moves the sliding block carrying the grip-fingers with the strip of paper having the paste applied to one side forward to feed the end of it to the former-cylinder, which continues to rotate on its own axis while it remains stationary in the path of its own plane, and enough gummed or pasted paper is coiled around it to form the body or inside of the box. As soon as it starts to move forward again the dog 81 on the end of the arm 27 strikes the lug 80 on the movable shear-blade 77 and operates it to sever the paper. As hereinbefore described, the disk 19 then rotates the former-head 10, carrying the former-cylinder 28 one-fifth of a revolution, which carries said former-cylinder in line with a second paper-reel 65'. The paper on this reel is about one-half the width of the strip of paper on the reel 65, and it is intended to form the outside of the lower portion of the box. The second paper-reel 65' is mounted in a standard 66' on the table-bed 1, and the strip of paper passes over the paste-roller 68', journaled in a paste-reservoir 69'. The paper is then twisted one-quarter of a circle, as in the first instance, and passed between the vertical guide-rollers 70 71, and from them it is led to the grip-fingers 72' 73', and by them carried forward between the vertical shears 74', and its free end passed between one of the vertical rollers 53 and the lower end of the former-cylinder 28, where it is wound around the lower portion of the body of the box already formed on the cylinder. As the arm 27, carrying the former-cylinder 28, moves forward again the dog 81 strikes the lug 80' on the shears, severs the paper, and as it continues to move around the circle the lower circular edge of the partially-formed box passes over the upper surface of a paste-roller 121, mounted in a paste-reservoir 122, secured to the table-bed 1.

The mechanism connected with the second paper-reel 65', consisting of the sliding block 82', its grip-fingers 72' 73', the devices for operating them, as well as the cam-rod 92', the counter-shaft 95', and the cam 96' are all duplicates of the similar devices used in connection with the paper-reel 65, and as the operation of the parts is identical the description of the construction and operation given in the first instance will answer for this one. The counter-shaft 95' is journaled in a bracket 102', secured to the under side of the table, and on one end of said shaft is a bevel gear-wheel 119', which meshes with a similar gear-wheel X, secured to one end of the counter-shaft 95.

As before stated, the lower edge of the partially-formed box has had the paste applied to it as it passes over the face of the paste-roller 121, the former-cylinder meanwhile moving around one-fifth of a revolution, when it comes to a stop immediately above the female die 123, rigidly located in the table-bed.

124 represents the male die or punch, its upper end having a vertical movement in the female die 123, while its lower end is pivoted by a bolt 127 in a slot 126' in one end of the lever 126, fulcrumed in the bracket 125, secured to the under side of the table, and the free end of said lever rests against the periphery of a cam 128, mounted on the counter-shaft $95^i$, which is provided with a bevel-gear $95^k$, meshing with a similar gear $95^m$ on the counter-shaft 95'. At the same time that the former-cylinder comes to a stop at this point to receive the bottom of the box the lower end 47 of the lever 42 comes in contact with the beveled face 133 of the stationary bracket 134, secured to the table. This forces the lower end of said lever 42 inwardly to release the clutch-sleeve 35, which allows the former-cylinder 28 to remain stationary on its axis while the bottom is being applied to the partially-formed box. As soon as the end of the lever 42 passes the bracket 134 the clutch-sleeve 35 is again thrown into operation, and the former-cylinder resumes its revolutions on its own axis as it is moving around to the next stopping-point. A strip of cardboard 129 from a roll 129' of the required width to form the bottom of the box passes in guides 130 131 along the bottom of the bed 1 and immediately below the female die 123, so that as the male die 124 is forced upward by the lever 126 and cam 128 a blank, forming the bottom of the box, is punched out and up through the female die 123, the said blank, after it is punched out, resting on the plane face 132 of the male die 124 and by it pressed into intimate contact with the gummed edge of the partially-formed box on the former-cylinder 28, which remains stationary at this point to receive it, and as the male die recedes it leaves the said bottom adhering to the box.

135 is a feed-roller located in the bed of the table, and immediately below and parallel with it is a second feed-roller 136, journaled in brackets 137 137, secured to the table. A spiral spring 138 is located in each bracket, and they press the lower roller upwardly with sufficient friction to carry the cardboard between it and the top roller.

The journal 139 of the upper feed-roller 135 projects beyond the outer end of the lower feed-roller, and on the outer end of said journal 139 is mounted a spider 140, provided with a series of radial arms 141 141, the outer ends of which are in the path of the lower end 47 of the lever 42, which, as it passes around, strikes against one of the projecting arms 141, carrying it around a sufficient distance to rotate the feed-roller 135 and feed the pasteboard strip along far enough to present a solid portion to the dies to punch out another blank for the bottom of the box. Assume now that the former-cylinder has moved around the third fifth of the circle and is in line with the third paper-reel $65^2$, mounted on a standard $66^2$, which carries a roll of thin paper to form the binder for the outside and bottom of the box, covering the joint formed at this point. This strip of paper is preferably colored and glazed on one side, the paste being applied to the unglazed side. From the reel $65^2$ the paper passes over the surface of the paste-roller $68^2$, journaled in a paste-reservoir $69^2$. The strip of paper is then twisted the quarter of a circle, as in the first instance, then passed between the vertical guide-rollers $70^2$ $71^2$, and from them it is led to the grip-fingers $72^2$ $73^2$ and by them moved forward between the vertical blades of the shears $74^2$ until its end is passed between one of the vertical rollers 53 and the lower end of the former-cylinder 28, and after enough of the paper has been fed off to encircle the box the strip is cut by the shears and the continued revolution of the former-cylinder draws in the severed end and wraps it around the box. The grip-fingers $72^2$ $73^2$ are mounted on the sliding block $82^2$, having a reciprocating motion in the V-shaped guides $83^2$ $84^2$, secured to the under side of the table. The block $82^2$ is provided with a rod $85^2$, connected to a cam-rod $92^2$, operated by a cam $96^2$ on a counter-shaft $95^2$.

The construction and operation of the parts just mentioned are identical with the similar devices described in connection with the paper-reel 65, and the same description will answer for these.

The counter-shaft $95^2$ is mounted in a bracket $102^2$, secured to the under side of the table, and one end of said shaft is provided with a bevel-gear $119^2$, which meshes with a similar gear $95^b$, secured to the counter-shaft $95^a$, the opposite end of which is provided with a similar gear $95^d$, meshing in turn with a gear $95^e$ on the counter-shaft 95.

142 142' are a pair of soft rubber rollers horizontally mounted in a bracket 143, secured to the table-bed across the path of the edge of the bottom of the box, and after the binding-strip has been applied and the former-cylinder, with the box, attached resumes its journey through the fourth fifth of its revolution. These rollers press the projecting lower edge of the gummed side of the paper up against the bottom of the box, and this completes the operation of forming the lower half of a circular pill-box. As the former-cylinder 28 completes the fourth fifth of its revolution the upper end 64 of the shaft 55 comes in contact with the beveled face 143 of the arm 144 on the bracket 145, secured to the table 1, which forces said shaft downwardly, and the inner beveled edge 63 of the conical end 57 will spring inwardly, thus reducing the diameter of the former-cylinder and causing the finished box to drop off of the lower end of the former-cylinder. The former-cylinder then moves around the fifth fifth of its revolution, the end 64 of the shaft 55 having passed the beveled face 143 of the arm 144. The spiral spring 58, located in the former-cylinder, restores the shaft and lower end of said former-cylinder to their normal positions, and when said former-cylinder has completed a revolution in its own plane it is again in line with the paper-reel 65 and the operation of forming the lower half of a box is again begun and completed, as above described.

In forming the cover of the box the same operation as just described is carried out, with the exception that no paper is fed to the former-cylinder from the reel 65, that remaining idle, and the operation commencing at the reel 65' and continuing in regular order, as described, for the lower portion of the box. The lower portion of the box and its cover are identical in size, shape, construction, and formation, except that the lower portion of the box is provided with an inside body portion from the reel 65.

Each of the arms 27 on the former-head 10 is provided with a former-cylinder 28, and while only one arm and its former-cylinder has been followed around its circle and each successive step fully described, the others are following in regular order and passing through each step described in detail for the first one.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A paper-box-making machine, comprising a table, a main driving-shaft journaled in the legs of said table and provided with bevel gear-wheels 4 and 22, a vertical sleeve 7 journaled in said table and provided with a driving-disk 14, having a series of radial recesses 15, a disk 19 having a radial projecting lug 23 carrying a roller 25, engaging the recesses 15 in the disk 14, and mounted on a vertical shaft 17, provided with a bevel gear-wheel 21 meshing with the gear-wheel 22 on the main shaft, the upper end of said sleeve 7 having a former-head 10, having integral arms 27, in the outer ends of which are journaled a series of rotating former-cylinders 28, provided with gear-wheels 31, in combination with the gear-wheel 12 meshing with the gear-wheels on the former-cylinders, and mounted on a vertical shaft journaled in the said sleeve, and having its lower end provided with a bevel gear-wheel 5, meshing with the gear-wheel 4 on the main driving-shaft 3, as and for the purpose set forth.

2. In a box-making machine comprising the main driving-shaft 3, the gear-wheel 4 mounted thereon, the vertical shaft 6 provided with the gear-wheel 5, the sleeve 7 mounted on said shaft 6, the former-head 10 mounted on said sleeve 7, a series of former-cylinders 28 mounted on the radial arms 27 on said former-head 10, and provided with gear-wheels meshing with a gear-wheel 12 mounted on said shaft, substantially as and for the purpose set forth.

3. A paper-box-making machine, comprising a table, a main driving-shaft mounted in the legs of said table and provided with a bevel gear-wheel 4, a vertical shaft, a vertical sleeve in which said shaft is journaled and mounted in said table, said shaft having its lower end provided with a bevel gear-wheel meshing with the gear-wheel 4 on the main shaft, and having its upper end provided with a gear-wheel 12, the arms 27, a series of former-cylinders 28 journaled in the outer end of said arms and provided with gear-wheels 31 meshing with the gear-wheel 12, and having their upper face formed with a series of clutch-teeth, engaging a clutch-sleeve 35, mounted on the upper end of said cylinder 28, in combination with a lever 42, and means substantially as described for operating said lever, as and for the purpose set forth.

4. A paper-box-making machine, comprising a rotating former-head provided with a series of radial arms, in the outer ends of each of which is vertically journaled a former-cylinder provided with a gear-wheel 51 meshing with a series of pinions 52, secured to the upper ends of an annular series of rollers 53, journaled in the lower arm of a bracket 49, secured to the outer ends of the radial arms, and means for operating the former-cylinder, substantially as and for the purpose set forth.

5. A paper-box-making machine, comprising a rotary former-cylinder and means substantially as described for intermittently operating the same, in combination with a series of rollers rotating parallel with the lower end of said cylinder, the stationary shears 74, the grip-fingers 72 73 mounted on the reciprocating block 82, and the stationary vertical guide-rollers 70 71, as and for the purpose set forth.

6. A paper-box-making machine, comprising the former-cylinder, the male and female dies 124 123, the horizontal feed-rollers 135 136, the former being provided with radial arms 141, in combination with the movable former-cylinder, the lever 42 mounted on said cylinder, and having its lower end 47 in line with said radial arms 141, as and for the purpose set forth.

7. A paper-box-making machine, comprising the main driving-shaft 3, the gear-wheel 4 mounted thereon, the vertical shaft 6, the gear-wheel 5 and sleeve 7 mounted on said shaft, the former-head 10 mounted on the sleeve 7, a series of former-cylinders 28 mounted on the integral arms 27 of said former-head, adapted to rotate in a horizontal plane, and provided with gear-wheels meshing with a gear-wheel 12 on said shaft 6, a vertical shaft 55 mounted in said former-cylinders, a spiral spring 58 mounted on the shaft 55, in combination with a stationary arm 144 having a beveled face 143 located in the path of the upper end of the shaft 55, substantially as and for the purpose set forth.

In testimony whereof I hereunto affix my signature in presence of two witnesses.

GEO. H. HILGARTNER.

Witnesses:
GEO. H. MORRIS,
R. T. BROOKE.